UNITED STATES PATENT OFFICE.

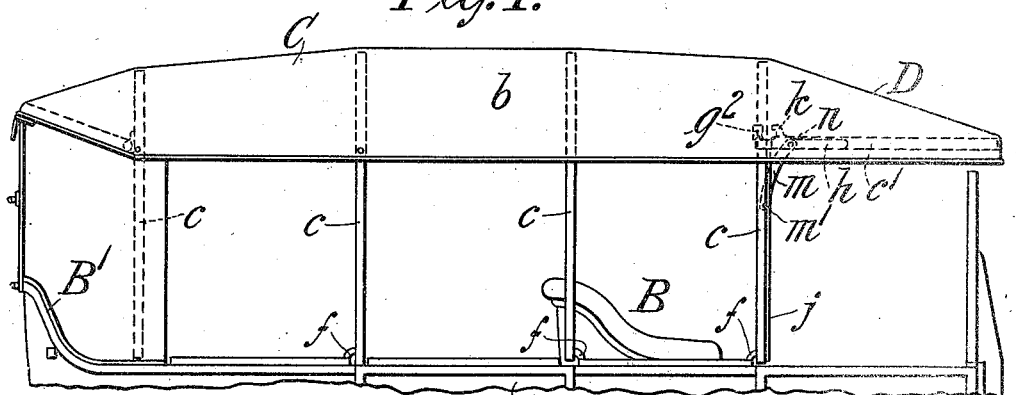

HINSDALE SMITH, OF SPRINGFIELD, MASSACHUSETTS.

FOLDABLE VEHICLE-TOP.

1,066,230.

Specification of Letters Patent. Patented July 1, 1913.

Application filed August 16, 1911. Serial No. 644,402.

*To all whom it may concern:*

Be it known that I, HINSDALE SMITH, a citizen of the United States of America, and resident of Springfield, in the county of Hampden and State of Massachusetts, have invented certain new and useful Improvements in Foldable Vehicle-Tops, of which the following is a full, clear, and exact description.

An object of this invention is to provide a simple, inexpensive, and easily and quickly adjustable means for holding the front or horizontal vizor supporting bow of a foldable top for automobiles in its extended position, and of such character that no portions of the bow supporting appliances form any impediment to easy entrance into, or exit from, the automobile.

Another object is to provide a new means whereby the front or vizor-supporting bow may be folded back upon the other bows;—when the top is not in use,—to form an unusually compact and better arrangement of the foldable top.

The invention is described in conjunction with the accompanying drawings and is set forth in the claims.

In the drawings:—Figure 1 is a side elevation of the upper part of an automobile body and the attached foldable top in its extended position. Fig. 2 is a horizontal sectional view taken just above the hood or vizor supporting bow, showing the bow and the attached means for holding it in its extended position. Fig. 3 is a sectional elevation of the vizor-supporting bow in its extended position, as seen from the inner side of the automobile. Fig. 4 is a sectional elevation of the same but showing the parts in their folded position. Fig. 5 is a perspective view of the improved device.

This device is more especially intended to be used with automobiles having two seats and carrying a flexible top, designed when not in use, to be folded back beyond the rear seat in a compact arrangement, and to this end the hood or vizor-supporting bow has simple and peculiarly arranged means for holding it in its extended position and for quickly and easily folding it back upon the other rear bows in a compact form.

It is often the case in automobile tops having hoods of the type to which this invention relates that metallic supports and straps extend from the front of the hood to the lower extremity of the front vertical bow, making entrance to the front seat of the automobile difficult, but under my invention this difficulty is overcome, as will be rendered apparent herein.

In the drawings:—A represents the upper portion of the body of an automobile of the fore-door type, having the two seats B and B', and carrying a flexible top C which comprises the bows $c$, the horizontally disposed hood or vizor supporting bow $c'$, which is detachably connected to the front upright bow $c$, and a covering $b$ of flexible material. The legs of each of the upright bows are detachably engaged in a somewhat usual manner in the brackets $f$ attached to the body of the automobile. To the inner side of the two upright legs of the front bow member $c$ are secured metallic strips $j$, which, as here shown, extend from the brackets $f$ to a position just above the vizor-supporting bow $c'$, at which position are rigidly mounted metallic appliances $g^2$ having downwardly opening sockets. The vizor-supporting bow $c'$ has metallic members in the form of strips or bars $h$ secured to the inner faces of the side portions thereof which have their ends in extension beyond the extremities of the legs of said bow. At the ends of said metallic members $h$ are upwardly projecting lugs $i$ to engage in the sockets $g$ for the purpose of holding,—somewhat in the manner of a lock,—the vizor-supporting bow in its extended position. Upon each of the metallic strips $h$ at positions near, but forwardly of the upwardly projecting lugs $i$, is provided the rearwardly extending lug $k$. A link $m$ is secured to each of the metallic members $h$ adjacent the lug $k$ and also to each of the strips $j$ on the front upright bow $c$,—$n$ and $m'$ representing the connecting pivots.

When the hood or vizor member, of the top C, is in its extended horizontal position, the lug $i$ on the metallic member $h$ engages in the casing or pocket $g$ and is held from accidental displacement by the link $m$. When the hood member is in this position, easy entrance to the front seat of the automobile is not interfered with, there being no metallic supports or straps extending from the outer end of the hood to the bow $c$.

When the top C is to be carried on the automobile but is not desired in its spread or normal condition, as shown in Fig. 1, the forward part of the vizor-supporting bow $c'$ is swung bodily in an upward direction, upon the pivot $n$, until the then downwardly moving lug $i$ becomes disengaged from the socket or casing $g$, when said bow $c'$ is free to be swung downwardly until the lug or hook $k$ enters for a retaining engagement into the socket $o$ which is located comparatively low down on the metallic strip $j$ on the front bow $c$. After the lug $i$ becomes, by the tilting of the horizontal bin, disengaged from the socket $g$ the end of the bow $c'$ on which said lug $i$ is located, is swung forwardly and downwardly about the link pivot $n$, and the link $m$ makes approximately one half of a revolution upon its pivot $m'$, so that the then vertical lug $k$ in the downward movement engages in the socket $o$, and the normally forward end of the vizor-supporting bow $c'$ is positioned adjacent the top of the upright bow $c$; whereupon the flexible covering $b$ falls in a fold between the two comparatively closely folded bows $c$ and $c'$. When the hood member is in this position, the automobile top C may be folded back out of the way in the usual manner and the horizontal or vizor bow will not project beyond the other bows when they are all in their folded condition.

I claim:

1. In a foldable top for automobiles, the combination with an upright bow having, at an upper portion thereof, a fixture provided with a downwardly opening socket, and having at a lower portion thereof a fixture provided with an upwardly opening socket, of a horizontal bow provided at its rear extremity with an upwardly extended lug, and provided at a short distance forward of such lug with another lug upwardly off-set from the bow and rearwardly projecting, and a link pivoted to the upright bow below the upper socketed fixture thereon and to the horizontal bow forward of the rear extremity thereof.

2. In a foldable top for automobiles, in combination, an upright bow and a horizontal bow, and a link pivoted to the horizontal bow near its rear end and to the upright bow below the horizontal bow whereby the horizontal bow may be swung on the upper end of the link to a vertical position and then with the link swung to a lowered position closely alongside the upright bow, and means comprising members secured to the upright and horizontal bows and coacting for interlocking engagements with each other for detachably holding the horizontal bow in its upper horizontal forwardly extended position and also in its vertical position alongside of the upright bow.

Signed by me at Springfield, Mass., in presence of two subscribing witnesses.

HINSDALE SMITH.

Witnesses:
  WM. S. BELLOWS,
  G. R. DRISCOLL.